US012205047B2

(12) United States Patent
Bennati et al.

(10) Patent No.: US 12,205,047 B2
(45) Date of Patent: Jan. 21, 2025

(54) METHOD, APPARATUS, AND COMPUTER PROGRAM PRODUCT FOR ANONYMIZED PARKING LIKELIHOOD ESTIMATION

(71) Applicant: HERE Global B.V., Eindhoven (NL)

(72) Inventors: Stefano Bennati, Zürich (CH);
Aleksandra Kovacevic, Wettswil (CH);
Kai Pöthkow, Berlin (DE); Elena Vidyakina, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 922 days.

(21) Appl. No.: 17/118,159

(22) Filed: Dec. 10, 2020

(65) Prior Publication Data

US 2021/0365812 A1    Nov. 25, 2021

Related U.S. Application Data

(60) Provisional application No. 63/027,507, filed on May 20, 2020.

(51) Int. Cl.
*G06N 5/04* (2023.01)
*G06F 16/2455* (2019.01)
(Continued)

(52) U.S. Cl.
CPC .......... *G06N 5/04* (2013.01); *G06F 16/2455* (2019.01); *G06F 16/29* (2019.01); *G06N 20/00* (2019.01)

(58) Field of Classification Search
CPC . G06N 5/04; G06N 20/00; G06N 3/04; G06F 16/2455; G06F 16/29
See application file for complete search history.

(56) References Cited

U.S. PATENT DOCUMENTS 10,515,551 B1    12/2019   Woodard et al.
10,528,760 B2    1/2020    Cho et al.
(Continued)

FOREIGN PATENT DOCUMENTS

CN         105957398 A     9/2016

OTHER PUBLICATIONS

Huang et al., *Parking Query in Vehicular Delay-tolerant Networks with Privacy Protection Based on Secure Multiparty Computation*, Journal of Sensors, vol. 2015, Article ID 420912 (9 pages) Nanjing University of Posts and Telecommunications, China.

*Primary Examiner* — Pei Yong Weng
(74) *Attorney, Agent, or Firm* — Peter H. Yu; HERE GLOBAL B.V.

(57) ABSTRACT

A method, apparatus, and computer program product are provided for estimating parking availability in an area based on probe data points in response to a request while maintaining data privacy. A method may include: receiving probe data associated with a plurality of vehicles; determining, from the probe data, location information, parking event information, and a timestamp; receiving a parking availability query, where the parking availability query includes a location; generating and transmitting a request for parking availability information corresponding to the location; receiving a plurality of partial results in response to the request for parking availability information corresponding to the location; determining, from the plurality of partial results, parking availability information corresponding to the location; and providing the parking availability information corresponding to the location responsive to the parking availability query.

16 Claims, 6 Drawing Sheets

(51) Int. Cl.
*G06F 16/29* (2019.01)
*G06N 20/00* (2019.01)

(56) References Cited

U.S. PATENT DOCUMENTS

| | | |
|---|---|---|
| 2009/0030778 A1 | 1/2009 | Zapata et al. |
| 2018/0096166 A1 | 4/2018 | Rogers et al. |
| 2018/0204465 A1* | 7/2018 | Tong ........................ G06N 7/01 |
| 2021/0133603 A1* | 5/2021 | Zhu ........................ G06N 3/006 |

* cited by examiner

METHOD, APPARATUS, AND COMPUTER PROGRAM PRODUCT FOR ANONYMIZED PARKING LIKELIHOOD ESTIMATION

CROSS-REFERENCE TO RELATED APPLICATIONS

This application claims priority to U.S. Provisional Patent Application Ser. No. 63/027,507, filed on May 20, 2020, the contents of which are hereby incorporated by reference in their entirety.

TECHNOLOGICAL FIELD

An example embodiment of the present disclosure relates to estimating the availability of parking at a location, and more particularly, to using historical vehicle probe data to anonymously establish the likelihood of available parking at a specified location.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for anonymously establishing the likelihood of parking proximate a specified location. According to an example embodiment, an apparatus is provided including at least one processor and at least one memory including computer program code, the at least one memory and computer program code configured to, with the processor, cause the apparatus to at least: receive probe data associated with a plurality of vehicles; determine from the probe data location information, parking event information, and a timestamp; receive a parking availability query, where the parking availability query includes a location; generate and transmit a request for parking availability information corresponding to the location; receive a plurality of partial results in response to the request for parking availability information corresponding to the location; determine, from the plurality of partial results, parking availability information corresponding to the location; and provide the parking availability information corresponding to the location responsive to the parking availability query.

In response to receiving the parking availability query, the apparatus of an example embodiment is further caused to generate a partial result, where causing the apparatus to determine, from the plurality of partial results, parking availability information corresponding to the location includes causing the apparatus to determine, from the plurality of partial results and the partial result, parking availability information corresponding to the location. Causing the apparatus to generate and broadcast the request for parking availability information may include causing the apparatus to generate and transmit the request to a plurality of servers participating in a secure multi-party computation protocol. Causing the apparatus to determine, from the plurality of partial results, parking availability information corresponding to the location may be performed in response to receiving the plurality of partial results from each of the plurality of servers participating in the secure multi-party computation protocol. In response to receiving the plurality of partial results from fewer than a predetermined number of the plurality of servers participating in the secure multi-party computation protocol, the apparatus is caused to fail to determine parking availability information corresponding to the location.

According to an example embodiment, causing the apparatus to provide the parking availability information corresponding to the location responsive to the parking availability query may include causing the apparatus to provide the parking availability information and guidance information based on the parking availability information to the location response to the parking availability query. The parking availability query may be received in encrypted format, where the parking availability information corresponding to the location is provided in encrypted format responsive to the parking availability query. The plurality of partial results received in response to the request for parking availability information may be received from separate sources.

Embodiments provided herein may include a computer program product having at least one non-transitory computer-readable storage medium with computer-executable program code portions stored therein, the computer-executable program code portions including program code instructions to: receive probe data associated with a plurality of vehicles; determine, from the probe data, location information, parking event information, and a timestamp; receive a parking availability query, where the parking availability query includes a location; generate and transmit a request for parking availability information corresponding to the location; receive a plurality of partial results in response to the request for parking availability information corresponding to the location; determine, from the plurality of partial results, parking availability information corresponding to the location; and provide the parking availability information corresponding to the location responsive to the parking availability query.

In response to receiving the parking availability query, the computer program product of some example embodiments may include program code instructions to generate a partial result, where the program code instructions to determine, from the plurality of partial results, parking availability information corresponding to the location may include program code instructions to determine, from the plurality of partial results and the partial result, parking availability information corresponding to the location. The program code instructions to generate and transmit the request for parking availability information may include program code instructions to generate and transmit the request to a plurality of servers participating in a secure multi-party computation protocol. The program code instructions to determine, from the plurality of partial results, parking availability information corresponding to the location may be performed in response to receiving the plurality of partial results from each of the plurality of servers participating in the secure multi-party computation protocol. In response to receiving the plurality of partial results from fewer than a predetermined number of the plurality of servers participating in the secure multi-party computation protocol, the computer program product fails to determine parking availability information corresponding to the location.

The program code instructions of an example embodiment to provide the parking availability information corresponding to the location responsive to the parking availability query may include program code instructions to provide the parking availability information and guidance information based on the parking availability information to the location responsive to the parking availability query. The parking availability query may be received in encrypted format and the parking availability information corresponding to the location may be provided in encrypted format responsive to the parking availability query. The plurality of partial results received in response to the request for parking availability information may each be received from a separate source.

Embodiments provided herein may include a method including: receiving probe data associated with a plurality of vehicles; determining, from the probe data, location information, parking event information, and a timestamp; receiving a parking availability query, where the parking availability query includes a location; generating and transmitting a request for parking availability information corresponding to the location; receiving a plurality of partial results in response to the request for parking availability information corresponding to the location; determining, from the plurality of partial results, parking availability information corresponding to the location; and providing the parking availability information corresponding to the location responsive to the parking availability query.

According to an example embodiment, in response to receiving the parking availability query, methods may include generating a partial result, where determining, from the plurality of partial results, parking availability information corresponding to the location includes determining, from the plurality of partial results and the partial result, parking availability information corresponding to the location. Generating and transmitting the request for parking availability information may include generating and transmitting the request to a plurality of servers participating in a secure multi-party computation protocol, where determining, from the plurality of partial results, parking availability information corresponding to the location is performed in response to receiving the plurality of partial results from each of the plurality of servers participating in the secure multi-party computation protocol. The plurality of partial results received in response to the request for parking availability information may each be received from a separate source.

Embodiments provided herein may include an apparatus including: means for receiving probe data associated with a plurality of vehicles; means for determining, from the probe data, location information, parking event information, and a timestamp; means for receiving a parking availability query, where the parking availability query includes a location; means for generating and transmitting a request for parking availability information corresponding to the location; means for receiving a plurality of partial results in response to the request for parking availability information corresponding to the location; means for determining, from the plurality of partial results, parking availability information corresponding to the location; and means for providing the parking availability information corresponding to the location responsive to the parking availability query.

According to an example embodiment, in response to receiving the parking availability query, the apparatus may include means for generating a partial result, where the means for determining, from the plurality of partial results, parking availability information corresponding to the location includes means for determining, from the plurality of partial results and the partial result, parking availability information corresponding to the location. The means for generating and transmitting the request for parking availability information may include means for generating and transmitting the request to a plurality of servers participating in a secure multi-party computation protocol, where the means for determining, from the plurality of partial results, parking availability information corresponding to the location is performed in response to receiving the plurality of partial results from each of the plurality of servers participating in the secure multi-party computation protocol. The plurality of partial results received in response to the request for parking availability information may each be received from a separate source.

BRIEF DESCRIPTION OF THE DRAWINGS

Figure 1:
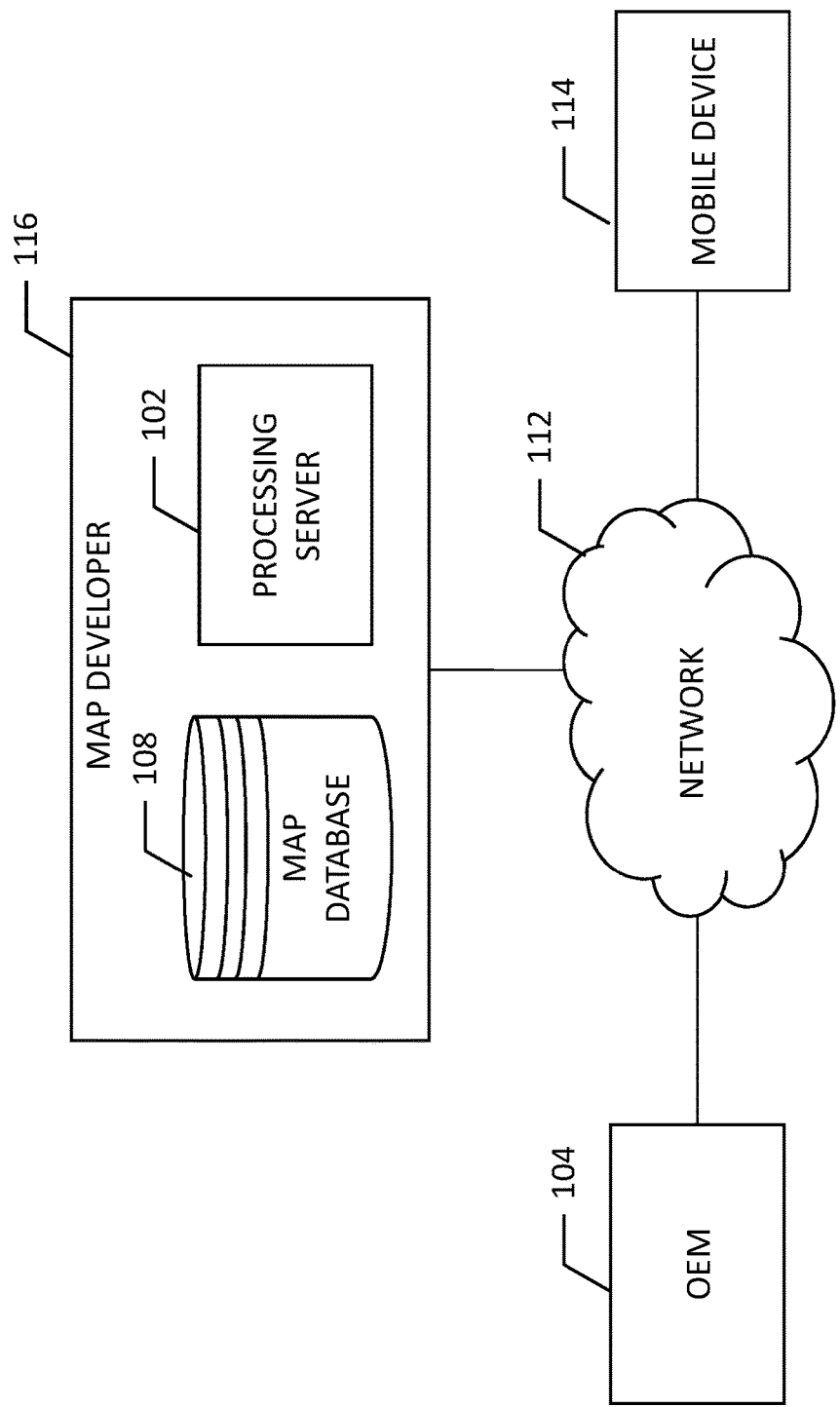
Figure 2:
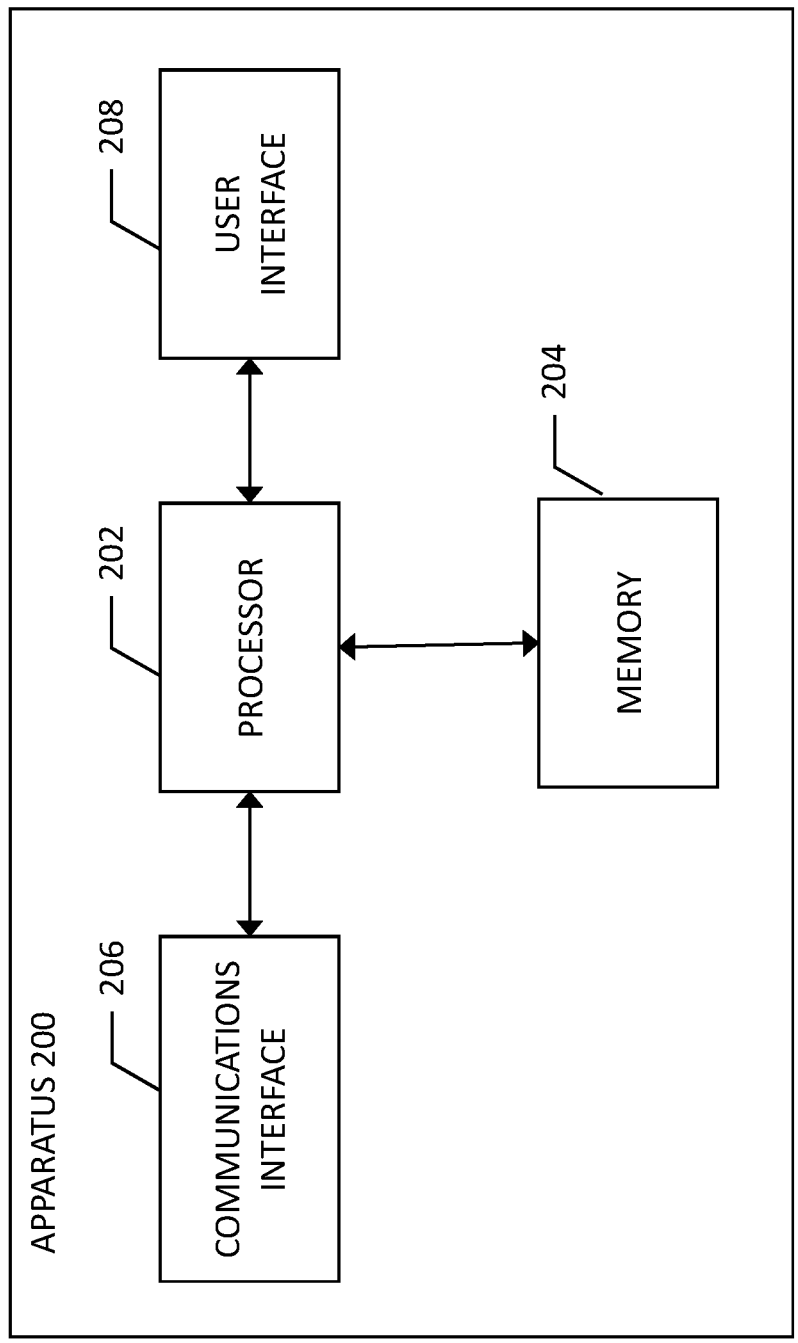
Figure 3:
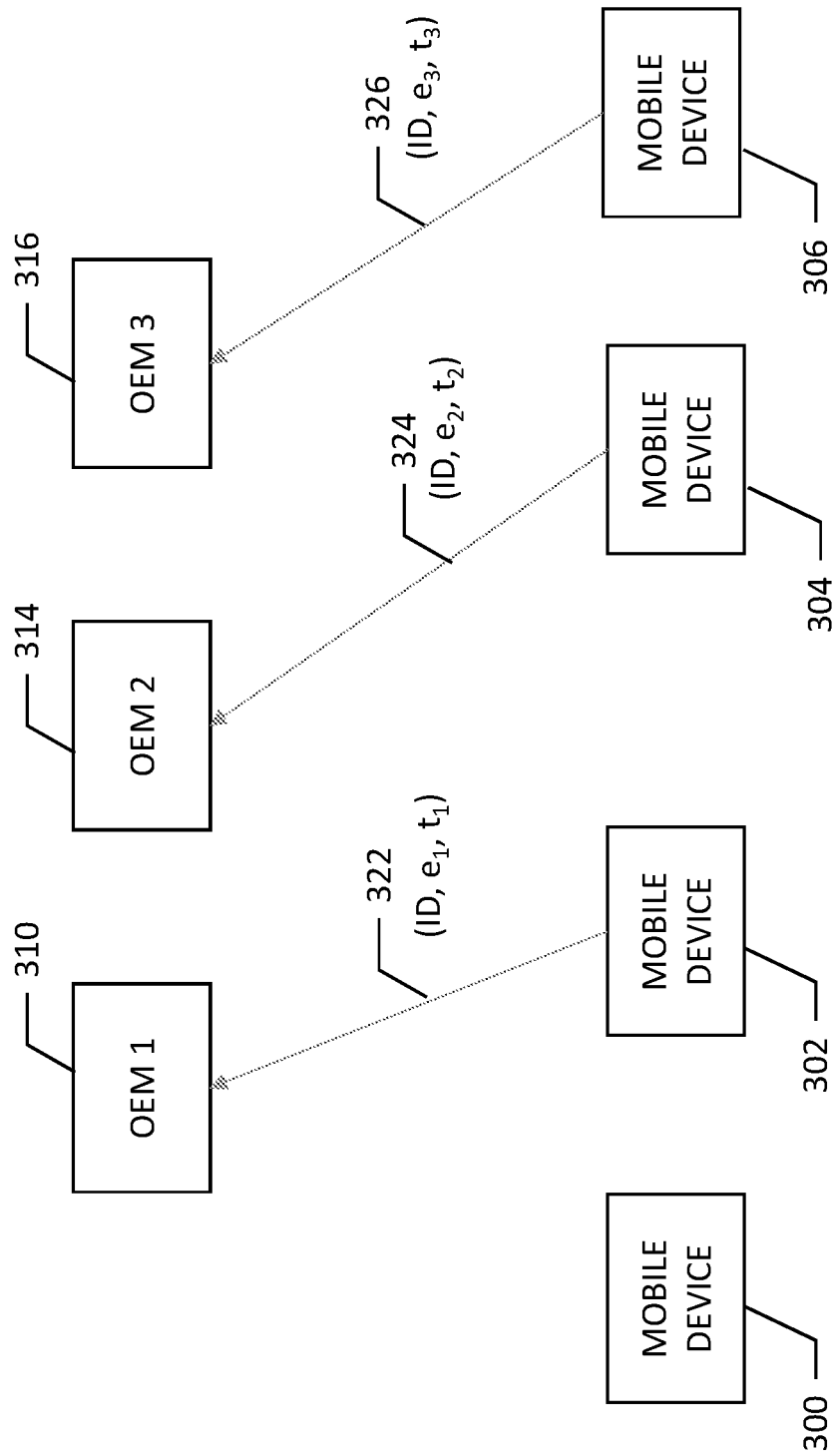
Figure 4:
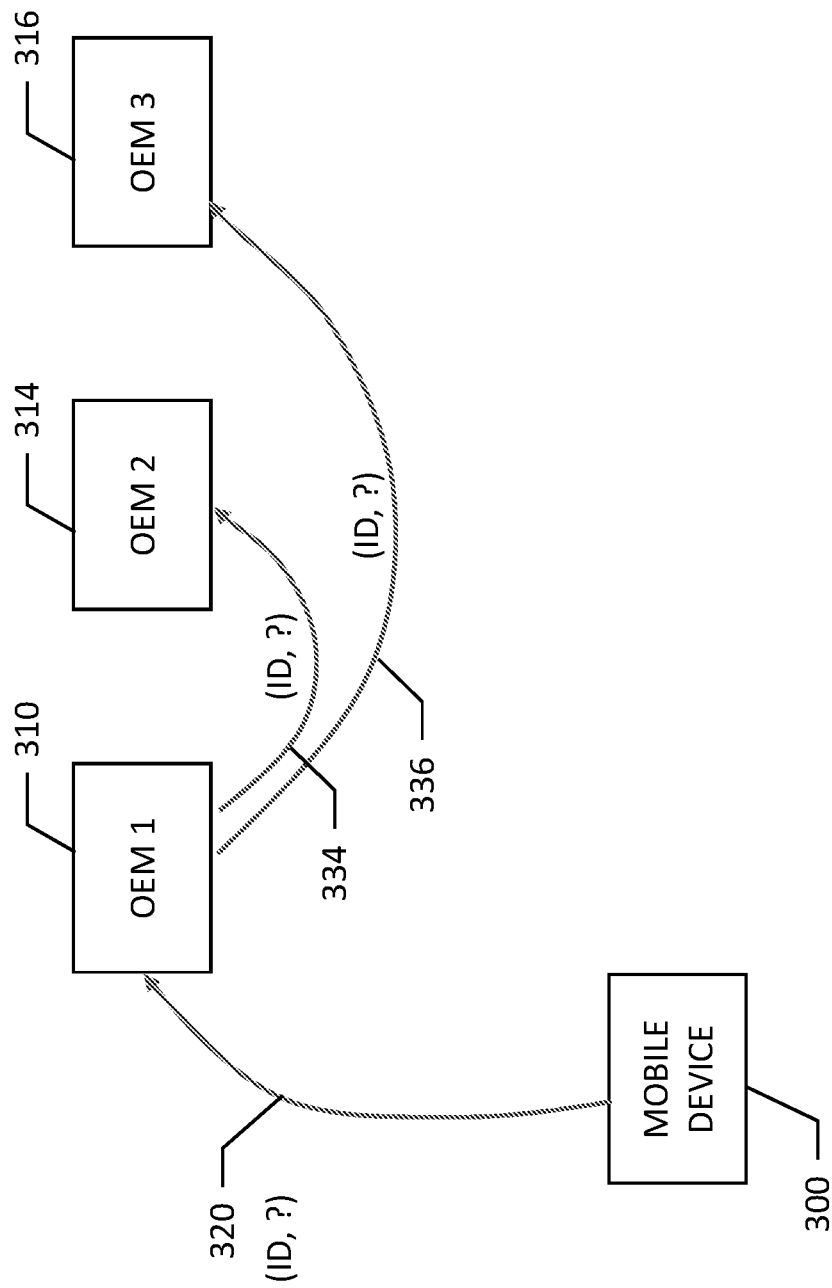
Figure 5:
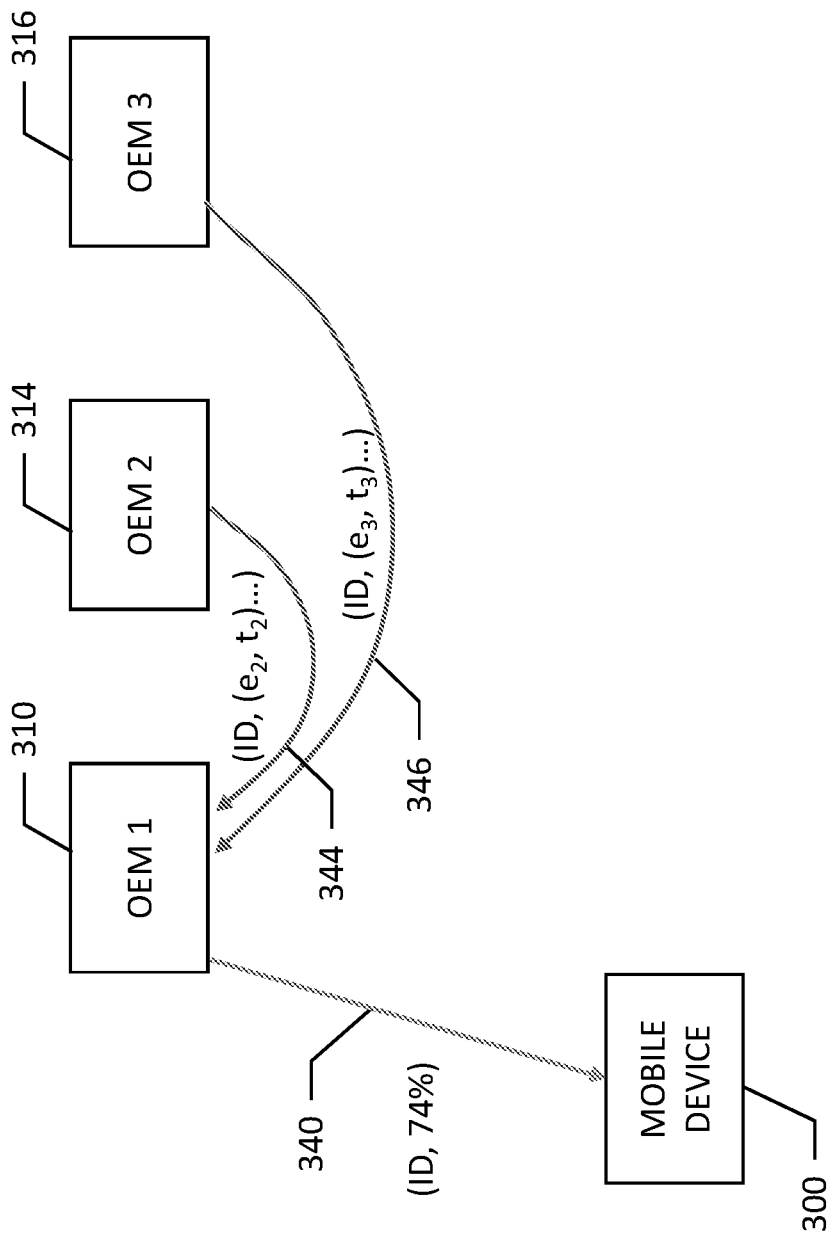
Figure 6:
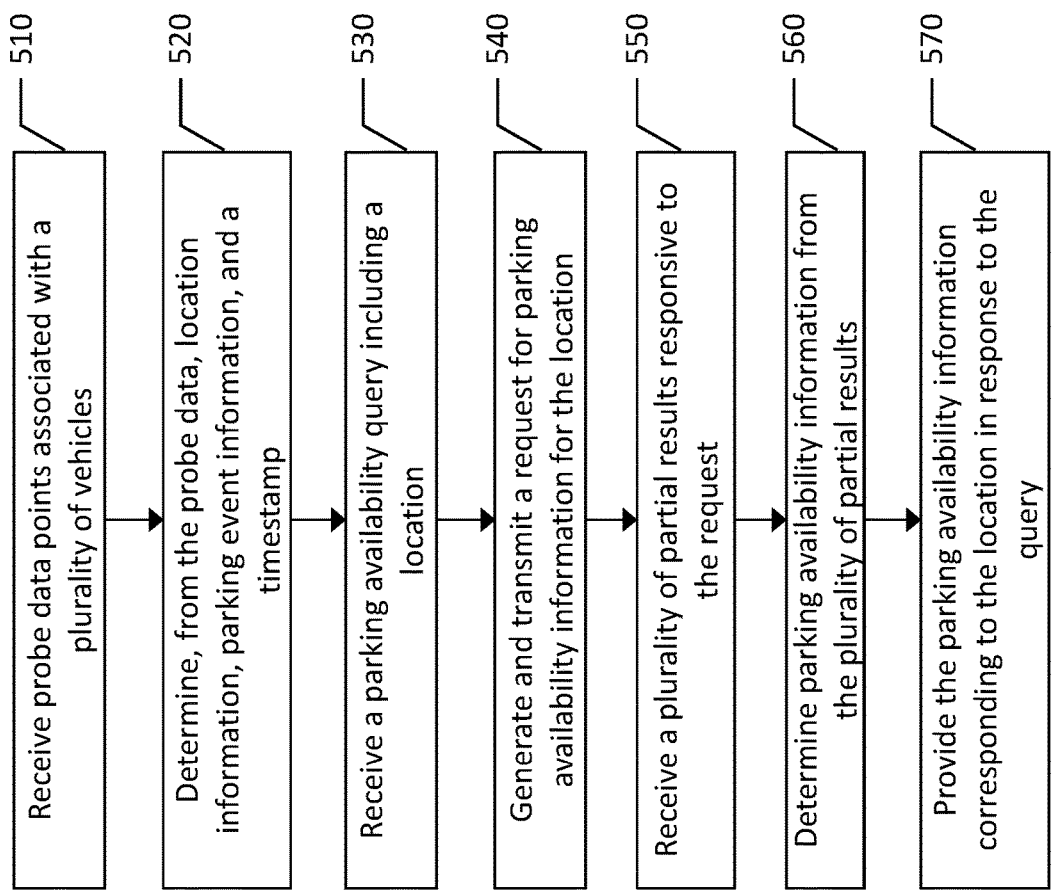

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for anonymously determining parking likelihood proximate a specified location in accordance with an example embodiment of the present invention;

FIG. 3 is a message flow diagram among mobile devices and OEMs according to an example embodiment of the present disclosure;

FIG. 4 is another message flow diagram among mobile devices and OEMs according to an example embodiment of the present disclosure;

FIG. 5 is still another message flow diagram among mobile devices and OEMs according to an example embodiment of the present disclosure; and FIG. 6 is a flowchart of a method for determining parking availability while preserving data privacy according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

A method, apparatus, and computer program product are provided herein in accordance with an example embodiment for using observed behavior from vehicles to establish where vehicle parking is available, and estimating the availability of vacant parking spaces based on vehicle probe data. Determining the location of parking lots and on-street parking (e.g., adjacent or along a roadway) can be difficult in environment with which a user is unfamiliar. Users may find themselves driving and searching for parking lots or spaces proximate their destination when they are unfamiliar with an area. This can be frustrating and time consuming. Vehicles and drivers of vehicles include devices capable of generating data (e.g., probe data) representative of parking availability deduced by analysis of the generated data. However, this data can potentially be used to establish the identification and parking behaviors of a user. As such, embodiments described herein solve the problem of providing estimates of parking availability while preserving the privacy of vehicle drivers and/or occupants.

To provide an improved manner of identifying parking availability in response to a request while maintaining the privacy of the requestor, a system as illustrated in FIG. 1 may be used. FIG. 1 illustrates a communication diagram of an example embodiment of a system for implementing example embodiments described herein. The illustrated embodiment of FIG. 1 includes a map developer system 116, a processing server 102 in data communication with an original equipment manufacturer (OEM) 104 and/or a geographic map database, e.g., map database 108 through a network 112, and one or more mobile devices 114. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent parking availability services such as Parkopedia, Parkpay, or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. Further, data may be compiled relating to the existence of parking and parking space availability along different road segments of the map database, where a parking availability estimation may be generated in dependence of time of day, day of week, season of the year, special events, etc. Park-in and park-out events, may be established based on the assessment of whether a vehicle is performing a parking maneuver followed by a stop in movement of the probe (park-in) or a vehicle is performing a parking maneuver followed by continued movement of the probe (park-out), and the relative movement of vehicles performing park-in to performing park-out maneuvers can be used to estimate parking availability. Further, this data can be compiled for temporal clustering of epochs to estimate future parking availability. The navigation-related functions can correspond to vehicle navigation, pedestrian navigation, or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for determining parking availability along road segments within regions of a map. Parking availability is described herein as whether or not parking spaces may be available (i.e., are not currently occupied). The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102 and/or OEM 104. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Location-based services (LBS) such as real-time traffic information, fleet management, and navigation among others, are based on the analysis of mobility data that users of such services provide. Mobility data is associated with a privacy level and accuracy value. An accuracy value is based on the intrinsic utility of data toward the generation of location-based services. The privacy value reflects the sensitive information that mobility data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider.

Embodiments described herein provide estimates of parking availability while preserving the privacy of users (e.g., drivers and/or occupants). Standard navigation algorithms do not consider parking availability when recommending a route to users, which can result in users spending time looking for parking after they reach their destination. Advanced services can recommend routes with high chances of finding a parking spot before reaching the destination, thereby reducing the total driving time, fuel consumption, and emissions. To do this, the computation of parking availability estimates for the road segments around the destination is required.

Parking data, as used herein, is defined as a set of events, each of which includes a location identifier (e.g., latitude, longitude, timestamp, and sensory reading). Parking data may be produced by vehicles or mobile devices 114 during driving and parking. Parking data may be collected and analyzed by a central backend server, which may be embodied by the OEM 104 or the processing server 102 when the processing server is functioning as the OEM. Parking data is very privacy sensitive as it can reveal where a vehicle is parked, and thus reveal behaviors of the user and the purpose of their travel.

Parking data may optionally be collected by vehicles when they are not actively parked, parking, or searching for parking. For example, as vehicles are more commonly equipped with a suite of sensors capable of establishing properties of their environment, vehicles may gather data from their surroundings. For instance, as a vehicle travels along a street in an urban or semi-urban environment, the vehicle may identify whether parking spaces exist proximate a street, and the vehicle may identify whether the parking spaces are occupied in order to report on parking availability. Optionally, map data may include locations where parking exists, such that a vehicle travelling past a location know to have parking spaces, the vehicle may identify whether those parking spaces are occupied. Such data collection may greatly increase the amount of information available regarding parking availability and may thus provide an improved reliability of parking availability information.

Generally, OEMs 104 collect parking data related to a subset of all vehicles on the road, such that different OEMs want to combine their data in order to obtain more accurate parking availability estimates. Given the privacy-sensitivity of parking data, disclosure of such parking data to third parties introduces privacy risks. As such, a privacy-preserving solution to computing parking availability has been developed as described herein.

Example embodiments of the present disclosure may provide a mechanism for establishing parking availability along a road segment in a region in response to a request based on probe data points from within that region, while using a secure multi-party computation protocol to preserve privacy. Vehicle data may be collected through probes which collect data points in the form of an ordered list of locations where the vehicle has traveled and a time associated with each location. Additional data may be included with probe data, such as vehicle heading, vehicle identification, environmental conditions, or the like. The time associated with probe data may include date and time, while the location may include coordinates, such as longitude and latitude of the location. The heading may include a compass direction or a degree heading, while the speed may be any unit of measure of the speed of the probe.

Map data, such as the map data contained in map database 108 of the map developer 116 or a map service provider may include links or segments, where each roadway in a mapped network comprises a series of interconnected links. Each link is associated with attributes about the geographical segment that they represent. A link may include link geometry data that is a list of coordinates that represent the geographical entity. Links may also include a total length of the geographic segment they represent.

Road segments represented by links can be used in calculating a route or recording a route as traveled. Nodes are end points corresponding to the respective links or segments of the road. Road link data records and node data records may be stored, for example, in map database 108, and may represent a road network. Road links and nodes can be associated with attributes such as geographic coordinates, street names, address ranges, speed limits, turn restrictions at intersections, and other navigation related attributes, as well as points of interest (POIs), such as traffic controls (e.g., stoplights, stop signs, crossings, etc.), fuel stations, hotels, restaurants, museums, stadiums, offices, repair shops, buildings, stores, parks, etc. The map database 108 can include data about places, such as cities, towns, or other communities, and other geographic features, such as bodies of water, mountain ranges, etc. Such place or feature data can be part of POI data or can be associated with POIs or POI data records.

Parking data, including location information, parking event information, and an associated timestamp, may be collected for road segments through collection of vehicle probe data. The vehicle probe data may include data relating to a path taken by a vehicle, where the data is indicative of finding a parking space proximate the destination of the path. Parking data including parking events may be discerned from vehicle probe data in a number of ways, such as through identification of historical paths of a particular probe, through an analysis of time spent by a probe at a location, through parking payment conducted via the mobile device, or various other methods. Parking data may be discerned from probe data based on machine learning whereby vehicle probe data is an input to a neural network and parking information is identified based on analysis of the probe data relative to learning data from which the neural network was trained. Parking data may be privacy-sensitive as described above, such that parking data may be received and analyzed by an OEM 104 that maintains privacy of the parking data analyzed. Parking data for a single OEM 104 may be of limited accuracy based on the OEM only receiving parking data from a subset of vehicles traveling among a road network. Dozens of OEMs or more may each receive only a subset of parking data based on the differing OEMs, such that none of the OEMs have a complete picture of parking availability based on the identified parking data.

The OEMs may want to compute parking availability estimates and provide those estimates to their customers based on a union of all data providers (OEMs), while simultaneously not wanting to reveal their data due to privacy concerns. Embodiments provided herein offer an application programming interface that implements a secure multi-party computation (SMPC) protocol to establish parking availability from the union of all data providers while also preserving privacy. Through the application programming interface, participants (data providing OEMs) can trigger the distributed computation of parking availability estimates for a specific area and use the estimate to provide a location-based service. The SMPC protocol requires the participants to agree on the analysis that will be executed on their data, hence eliminating the risk that the data provider executes an arbitrary and privacy-intrusive analysis on the data.

A user may request a route from an origin to a destination. Embodiments may provide a user interface to enable a user to request such a route, and optionally, a user may select whether parking at the destination is needed. Routing to a destination may not always require parking, such as when a vehicle is a rideshare vehicle, and the destination is a location where passengers are dropped off. In such an embodiment, parking is not required such that identifying parking for such a route may be superfluous and may result in the passengers being dropped off at a destination further from their intended destination as the ultimate destination may be a location proximate the destination with parking availability. As such, a user interface may provide an option whereby a user may indicate that parking is required proximate their destination. Optionally, rather than requesting a route from an origin to a destination, a user may request parking availability as they are approaching their destination.

In response to a user requesting a route from an origin to a destination that requires parking via a mobile device 114, which may be a vehicle navigation system, smart phone, etc., or in response to a user approaching a destination and requesting parking assistance, a query is sent to a respective data provider. The respective data provider may be the OEM 104 corresponding to the mobile device 114, which may in some instances be map developer 116. The query may be sent end-to-end encrypted between the vehicle and the data provider such that only the data provider knows where the user is wanting to park. Each data provider keeps a record of all parking data received by a subset of vehicles as described above as the parking data is privacy sensitive since it contains the record of the whereabouts of drivers, but it is assumed to be transmitted in an encrypted form, securely stored by the data provider and never shared with any third party.

FIG. 3 illustrates an example embodiment of mobile devices 302, 304, 306, each providing parking data to a respective OEM. As shown, mobile device 302 provides parking data 322 to OEM 1 310, mobile device 304 provides parking data 324 to OEM 2 314, and mobile device 306 provides parking data 326 to OEM 3 316. Each of these transmissions may be encrypted such that parking data from mobile device 304 may not be decrypted by anyone other than OEM 2 314. While the illustration depicts parking data sent to the OEMs, the data may be comprehensive vehicle probe data including data beyond just parking data, and the respective OEM may discern the parking data from the vehicle probe data as described above. The parking data, whether discerned from comprehensive vehicle probe data or provided as parking data, includes at least information regarding an identification of a road segment along which parking was found (ID), an event type (e) which may include a parking event, and a time period, time stamp, or epoch within which the parking was found (t). Each of parking data events 322, 324, and 326 are representative of parking data collected by the OEMs over a period of time and stored at a respective OEM. The parking data may be collected based on a variety of factors. For example, parking data may be collected on a rolling window of time, such as over the past hour or several hours. The parking data may optionally be collected based on times of day, days of the week, seasons of the year, special events, etc. and stored accordingly such that a parking availability query may include context, and the context of the query may be correlated to historical parking data with a corresponding context.

As shown in FIG. 4, a query 320 is received from mobile device 300 at OEM 1 310, where the query includes a link identifier (ID). The event and time are not necessary in the query as the request presumes the event is a parking availability request, while the time is established as when the query is received. Optionally, the query may include a context as described above for use with historical parking data. The query 320 may be encrypted according to the encryption of OEM 1 310 such that a request for parking availability cannot be identified by other third party entities. FIG. 4 illustrates the OEM 1 310 providing a SMPC protocol request to obtain an estimate of parking availability for the queried location. The request is sent to other OEMs participating in the SMPC protocol, and the location of interest is revealed to the other participants of the protocol as the link identifier (ID) as shown in requests 334 and 336.

While the illustrated embodiment depicts a single link identifier in the request, the request may include multiple link identifiers if multiple road links are proximate a destination and viable parking location candidates for a user. Embodiments may include a request with information relating to a location requesting parking availability within a map tile, a city square, a radius around the location, a bounding box, a neighborhood, or the like. Link identifiers may differ between map services providers, and may differ within a single provider when a road link identifier may be outdated. As such, embodiments may employ methods of identifying road links or road link identifiers using map-agnostic link identifiers, or through map-matching of a location (e.g., latitude and longitude) with a road link. Optionally, the request for parking availability may specify a specific parking space as such information may become available, such as through the use of proximity sensors on parking meters/charging stations, or as self-reporting of parking positions becomes more prevalent.

FIG. 5 illustrates the messages returned from the OEMs to OEM 1 310 as message 344 including parking data associated with the requested link ID from OEM 2 314, and message 346 including parking data associated with the requested link ID from OEM 3 316. The messages 344 and 346 returned from OEM 2 314 and OEM 3 316, respectively, are partial results, as described further below. While the illustrated SMPC protocol is implemented in FIGS. 3 through 5 by cooperating and participating OEMs, embodiments may include a server that functions to onboard and register participants in the SMPC protocol and may connect all participants to facilitate the SMPC protocol.

To implement the SMPC protocol, each of the participants—in this case the OEMs—generate a secret. Each participant obtains a share of the secret. The type of this secret depends upon the kind of analysis that the participants want to perform on their data. All participants have to agree on the analysis in order to create compatible shares. If one participant deviates, the protocol would produce a random result. Each participant integrates their partial results with each other, and participants cannot understand the value of another participant's data due to the randomness of the partial result. Thus, in the embodiment of FIG. 5, the messages 334 and 336 are not individually discernable to OEM 1 310. Each participant aggregates all partial results to obtain a final result. In the embodiment of FIG. 5, OEM 1 310 aggregates the partial results from OEM 2 314 and OEM 3 316 with its own partial result to obtain the final result. The final result in this case is message 340, which includes the link identifier (ID) and the likelihood of parking availability, which in the illustrated embodiment is 74%. The parking availability likelihood may not only be used at OEM 1 310, but as each participating OEM aggregates the data to obtain a result, each participant may store the result, at least temporarily, such that they can respond to a query request for the same information without having to involve the remaining participants when that query is received within a predetermined time of the original parking availability likelihood query.

As shown in FIG. 5, OEM 1 provides the final result to the mobile device 300 in message 340 as a location-based service. The message 340 is transmitted in encrypted form such that third parties cannot identify the location identifier associated with the final answer. The mobile device 300 may provide the final answer to a user (e.g., a driver or an occupant of the vehicle) or the mobile device 300 may process the final answer for providing guidance of the vehicle to a location where parking is likely to be available. The guidance may be in the form of providing navigational assistance to a driver, or the guidance may be in the form of autonomous or semi-autonomous control of the vehicle to the location where parking availability is likely.

According to the embodiment described above with respect to FIGS. 3-5, the parking availability may be established in an on-demand manner, such that a respective OEM triggers the request for parking availability on the one or more road links identified in the request of messages 324 and 326. This ensures that the parking availability data is fresh and provides the best opportunity for a user to find available parking.

FIG. 6 illustrates a flowchart illustrative of a method according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 7 illustrates a method of estimating parking availability in an area based on probe data points from that area. At 510, probe data points from a plurality of vehicles are received. From each of the probe data points, location information, parking event information, and a timestamp are obtained at 520. A parking availability query including a location is received at 530. A request for parking availability information is generated and transmitted at 540 for parking availability at the location. A plurality of partial results are received at 550 in response to the request. Parking availability is determined at 560 from the plurality of partial results received. The parking availability information corresponding to the location is provided at 570 in response to the query.

In an example embodiment, an apparatus for performing the method of FIG. 7 above may comprise a processor (e.g., the processor 202) configured to perform some or each of the operations (510-570) described above. The processor may, for example, be configured to perform the operations (510-570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-570 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
receive probe data associated with a plurality of vehicles;
determine, from the probe data, parking data;
receive a parking availability query, wherein the parking availability query comprises a location;
generate and transmit a request for parking availability information corresponding to the location to a plurality of servers;
generate a partial result in response to the request for the parking availability information corresponding to the location, wherein the partial result is a message including the parking data and is generated based on a share of a secure multi-party computation (SMPC) secret;
receive, from the plurality of servers, a plurality of partial results in response to the request for the parking availability information corresponding to the location, wherein the plurality of partial results are messages including parking data stored in the plurality of servers and are generated based on a plurality of shares of the SMPC secret, and wherein a combination of the partial result and the plurality of partial result forms a final result;
aggregate the partial result and the plurality of partial results to generate the final result, wherein the final result indicates the parking availability information corresponding to the location; and
provide the parking availability information corresponding to the location responsive to the parking availability query.

2. The apparatus of claim 1, wherein the apparatus and the plurality of servers participate in a secure multi-party computation protocol.

3. The apparatus of claim 1, wherein the at least one memory and computer program code is configured to, with the processor, cause the apparatus to at least, in response to receiving the plurality of partial results from fewer than a predetermined number of the plurality of servers, output a signal indicating that the apparatus failed to determine the parking availability information corresponding to the location.

4. The apparatus of claim 1, wherein the at least one memory and computer program code is configured to, with the processor, cause the apparatus to at least, provide guidance information based on the parking availability information to the location responsive to the parking availability query.

5. The apparatus of claim 1, wherein the parking availability query is received in encrypted format, and wherein the parking availability information corresponding to the location is provided in encrypted format responsive to the parking availability query.

6. The apparatus of claim 1, wherein the plurality of partial results received in response to the request for parking availability information are each received from a separate source.

7. A computer program product comprising at least one non-transitory computer-readable storage medium having computer-executable program code instructions stored therein, the computer-executable program code instructions, when executed by at least one processor, cause the at least one processor to:
receive probe data associated with a plurality of vehicles;
determine, from the probe data, parking data;
receive a parking availability query, wherein the parking availability query comprises a location;
generate and transmit a request for parking availability information corresponding to the location to a plurality of servers;
generate a partial result in response to the request for the parking availability information corresponding to the location, wherein the partial result is a message including the parking data and is generated based on a share of a secure multi-party computation (SMPC) secret;
receive, from the plurality of servers, a plurality of partial results in response to the request for the parking availability information corresponding to the location, wherein the plurality of partial results are messages including parking data stored in the plurality of servers and are generated based on a plurality of shares of the SMPC secret, and wherein a combination of the partial result and the plurality of partial result forms a final result;
aggregate the partial result and the plurality of partial results to generate the final result, wherein the final result indicates the parking availability information corresponding to the location; and
provide the parking availability information corresponding to the location responsive to the parking availability query.

8. The computer program product of claim 7, wherein the computer program code product is embodied within a server, and wherein the server and the plurality of servers participate in a secure multi-party computation protocol.

9. The computer program product of claim 7, wherein the computer-executable program code instructions, when executed by the at least one processor, cause the at least one processor to, in response to receiving the plurality of partial results from fewer than a predetermined number of the plurality of servers, output a signal indicating that the computer program failed to determine the parking availability information corresponding to the location.

10. The computer program product of claim 7, wherein the computer-executable program code instructions, when executed by the at least one processor, cause the at least one processor to provide guidance information based on the parking availability information to the location responsive to the parking availability query.

11. The computer program product of claim 7, wherein the parking availability query is received in encrypted format, and wherein the parking availability information corresponding to the location is provided in encrypted format responsive to the parking availability query.

12. The computer program product of claim 7, wherein the plurality of partial results received in response to the request for parking availability information are each received from a separate source.

13. A method comprising:
receiving probe data associated with a plurality of vehicles;
determining, from the probe data, parking data;
receiving a parking availability query, wherein the parking availability query comprises a location;
generating and transmitting a request for parking availability information corresponding to the location to a plurality of servers;
generating a partial result in response to the request for the parking availability information corresponding to the location, wherein the partial result is a message including the parking data and is generated based on a share of a secure multi-party computation (SMPC) secret;
receiving, from the plurality of servers, a plurality of partial results in response to the request for the parking availability information corresponding to the location, wherein the plurality of partial results are messages including parking data stored in the plurality of servers and are generated based on a plurality of shares of the SMPC secret, and wherein a combination of the partial result and the plurality of partial result forms a final result;
aggregate the partial result and the plurality of partial results to generate the final result, wherein the final result indicates the parking availability information corresponding to the location; and
providing the parking availability information corresponding to the location responsive to the parking availability query.

14. The method of claim 13, wherein the generating the partial result is performed at a server, and wherein the server and the plurality of servers participate in a secure multi-party computation protocol.

15. The method of claim 13, wherein the plurality of partial results received in response to the request for parking availability information are each received from a separate source.

16. The apparatus of claim 1, wherein each of the plurality of partial results is not individually discernible to the apparatus.

* * * * *